United States Patent
Sailing

(10) Patent No.: US 9,981,356 B2
(45) Date of Patent: May 29, 2018

(54) CNC MACHINE CUTTING FLUID DISCHARGING TOOL ACCESSORY

(71) Applicant: Jerome D Sailing, Carson City, NV (US)

(72) Inventor: Jerome D Sailing, Carson City, NV (US)

( * ) Notice: Subject to any disclaimer, the term of this patent is extended or adjusted under 35 U.S.C. 154(b) by 0 days. days.

(21) Appl. No.: 15/144,740

(22) Filed: May 2, 2016

(65) Prior Publication Data

US 2017/0021469 A1    Jan. 26, 2017

Related U.S. Application Data

(60) Provisional application No. 62/155,212, filed on Apr. 30, 2015.

(51) Int. Cl.
*B23Q 11/10*       (2006.01)
*B23G 1/44*        (2006.01)
(Continued)

(52) U.S. Cl.
CPC ........ *B23Q 11/1076* (2013.01); *B05B 9/0413* (2013.01); *B23G 1/16* (2013.01);
(Continued)

(58) Field of Classification Search
CPC . B23Q 11/10; B23Q 11/1076; B23Q 11/1084; B23G 2240/12; B23B 51/06;
(Continued)

(56) References Cited

U.S. PATENT DOCUMENTS 2,723,405 A * 11/1955 Woodward ............... B23G 1/16
                                                                 408/133
5,358,360 A * 10/1994 Mai .................... B23Q 11/1084
                                                                  279/20
(Continued)

FOREIGN PATENT DOCUMENTS

DE       102005060879 A1 *  6/2007  ............. B23B 31/02
SU           823077 A1 *    4/1981  ......... B23Q 11/1023

OTHER PUBLICATIONS

Machine translation, German patent document, DE102005060879, "Tool holder for threading tap has coolant jet to direct coolant into swarf groove in tap shaft". Leeb, F., Jun. 2007.*

*Primary Examiner* — Daniel Howell
*Assistant Examiner* — Chwen-Wei Su
(74) *Attorney, Agent, or Firm* — Dean A. Craine, P.S.

(57) ABSTRACT

A tool accessory used to apply different volumes of a cutting fluid to the tap under CNC control by causing the machine to undergo different pump cycles in which the rotational speed of the tool is increased above the tapping rotated and then quickly returned to the tapping rotation. The tool includes a tapping head, a reservoir filled with cutting fluid, a centrifugal force-reactive pump and at least two discharge nozzles. The pump includes a plurality of biased piston springs that are forced outward and store centripetal force when the tool is rotated at speeds above normal tapping speed. When the rotational speed of the tool is reduced, the piston springs overcome the centrifugal forces and force cutting fluid through the discharge nozzles. The volume of cutting fluid discharged is controlled by adjusting the viscosity of the cutting fluid, the tool's maximum speed, by using different size discharge nozzles, and by using different pump cycles.

3 Claims, 8 Drawing Sheets

(51) Int. Cl.
*B05B 9/04* (2006.01)
*B23G 1/16* (2006.01)
*B23B 51/06* (2006.01)

(52) U.S. Cl.
CPC .............. *B23G 1/44* (2013.01); *B23B 51/06* (2013.01); *B23B 2270/04* (2013.01); *B23G 2240/12* (2013.01); *B23Q 11/1084* (2013.01); *Y10T 279/17111* (2015.01); *Y10T 408/46* (2015.01)

(58) Field of Classification Search
CPC ............. B23B 2231/24; B23B 2270/04; Y10T 408/46; Y10T 279/17111
See application file for complete search history.

(56) References Cited

U.S. PATENT DOCUMENTS

| | | | |
|---|---|---|---|
| 5,564,168 | A | 10/1996 | Hostert, Jr. et al. |
| 5,890,849 | A * | 4/1999 | Cselle .................... B23B 31/00 279/20 |
| 5,927,439 | A | 7/1999 | Hanns |
| 6,116,825 | A * | 9/2000 | Kammermeier ........ B23B 51/06 279/20 |
| 6,679,484 | B2 | 1/2004 | Hattori |
| 6,770,197 | B2 | 8/2004 | Cooper |
| 6,783,309 | B2 | 8/2004 | Makiyama |
| 2014/0154020 | A1* | 6/2014 | Miyanaga .............. B28D 1/041 408/56 |

* cited by examiner

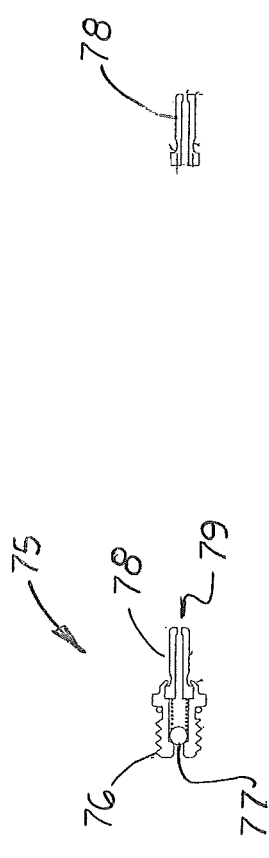
FIG. 8
FIG. 9
FIG. 10
FIG. 11

FIG. 13

LIST OF MATERIALS

| PART NAME | MATERIAL AND DESCRIPTION | H/T PROC |
|---|---|---|
| Filler Plug | | 29 |
| Res. Attach Screws | | 88 |
| Reservoir | | 27 |
| Check Ball Spring | | 115 |
| Check Ball | | 89 |
| Nozzle Assy. | | 80 |
| Spring Stop Pin | | 134 |
| Spring Stop | | 138 |
| Primary Spring | | 52 |
| Bearing Plate | | 122 |
| Piston Seal | | 124 |
| Piston | | 130 |
| Swing Arm Bearing | | 132 |
| Swing Arm Pin | | 140 |
| Swing Arm | | 150 |
| Scupper Plate | | 48 |
| NLRC Pump Seal | | 45 |
| NLRC Pump Body | | 42 |

CNC MACHINE CUTTING FLUID DISCHARGING TOOL ACCESSORY

This utility patent application incorporates by reference and claims the filing date benefit of U.S. Provisional patent application (Application No. 62/155,212) filed Apr. 30, 2015.

Notice is given that the following patent document contains original material subject to copyright protection. The copyright owner has no objection to the facsimile or digital download reproduction of all or part of the patent document, but otherwise reserves all copyrights.

BACKGROUND OF THE INVENTION

1. Field of the Invention

The present invention relates generally to devices used to deliver cutting fluid to a tap on a CNC machine, and more particularly to devices that enable's the CNC machine's program to automatically regulate the volume of tapping fluid delivered to the tap and workpiece.

2. Description of the Related Art

A computer numeral control machine, known as a CNC machine, is a computerized machine that uses a computer, a command controller, and a computer software program to control the machine's tools. The tools can include lathes, mills, routers and grinders. The software program, which is written in CNC machining language, controls all features like feed rate, coordination, location and speeds.

For metal working and machining processes cutting fluid, which is used as a coolant or as a lubricant, is applied to the end of the tool or to the work piece. The type and amount of cutting fluid applied depends on the size and depth of the cut and the work piece material.

What is needed is a tool accessory that attaches between a tool holder mounted on the spindle on a CNC machine and a tool used against a work piece. What is also needed is a tool accessory configured to automatically discharge at a desired rate and volume of cutting fluid dispensed onto the end of the tool or the work piece when the machine is operating. What is also needed is such a tool accessory that adjusts the amount and rate of cutting fluid released onto the end of the tool and work piece according to the rotation speed of the tool and the size and shape of the cut being made and the work piece material.

SUMMARY OF THE INVENTION

Disclosed herein is a tool accessory that allows a machinist to apply tapping fluid to the tap while under CNC computer programmed control by adjusting the speed of the tool when the tool is attached to the CNC machine's spindle. The tool accessory includes a shank that attaches to a tool holder that mounts on the end of the machine's spindle, a tapping head, a reservoir filled with cutting fluid, a centrifugal force-reactive pump and at least two discharge nozzles. The pump which is located below the reservoir includes a plurality of biased pistons and springs that are forced outward and store centripetal force when the tool is rotated above normal tapping speeds.

When the CNC program reduces the rotational speed of the spindle, the two piston springs overcome the centrifugal forces and force the tapping fluid stored in the piston cavity through check-valve controlled passages and through exchangeable discharge nozzles attached to the pump's body. One pump cycle includes the step of temporarily increasing the rotational speed of the tool and the step of quickly reducing the rotational speed to the desired tapping speed. When tapping holes in a workpiece, the machine may undergo pumping cycles depending on the size and number of holes being tapped.

The volume of cutting fluid discharged from the discharge nozzles on the tool accessory is controlled by: (1) the viscosity of the cutting fluid; (2) adjusting the tool's temporary rotational speed above the machine's desired tapping speed; (3) by selecting one of three discharge nozzle sizes, and, (4) by repeating the pump cycle. The tool accessory may be used with different discharge nozzles that have different sizes of discharge ports that can deliver different amounts of cutting fluid to the tap or workpiece.

BRIEF DESCRIPTION OF THE DRAWINGS

FIG. 8 is a sectional side elevational view of the discharge valve assembly showing the discharge nozzle disposed inside a discharge valve body.

FIG. 9 is a sectional side elevational view of a discharge nozzle.

FIG. 10 is a sectional side elevational view of the discharge valve body.

FIG. 11 is a top plan view of discharge valve body.

FIG. 13 is a table of listing the parts used to manufacture the tool accessory.

DESCRIPTION OF THE PREFERRED EMBODIMENT(S)

Figure 1:
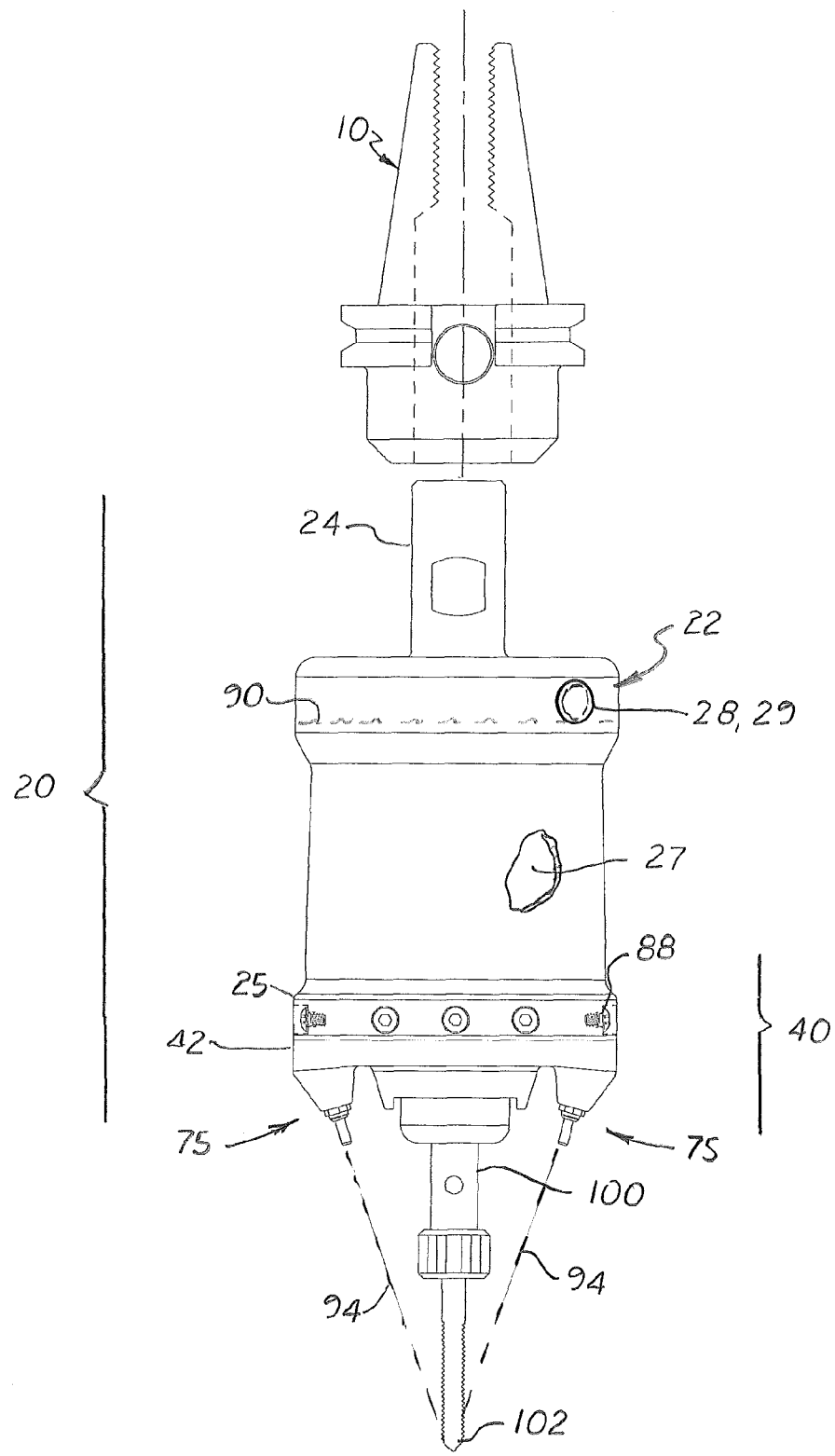
FIG. 1 is a side elevational view of the CNC machine cutting fluid discharging tool accessory.

Referring to the accompanying FIGS. 1-12, there is shown a cutting fluid discharge tool accessory 20 that includes a hollow reservoir body 22 filled with a cutting fluid 90. The reservoir body 22 includes an upper shank 24 that attaches to a tooling arbor 10 that fits into a CNC machine's spindle (not shown). The lower edge of the reservoir body 22 attaches to a centrifugal force-reactive pump assembly 40. The pump assembly 40 includes at least two discharge nozzle assemblies 75 that delivers cutting fluid 90 downward along a squirt path 94 to the hole to be tapped or to the cutting tap 102 that attaches to and extends downward from the tap head 100. The upper end of the tap head 100 attaches to a compatible recessed receiving cavity 47 formed on the lower surface of the pump body 42.

Figure 2:
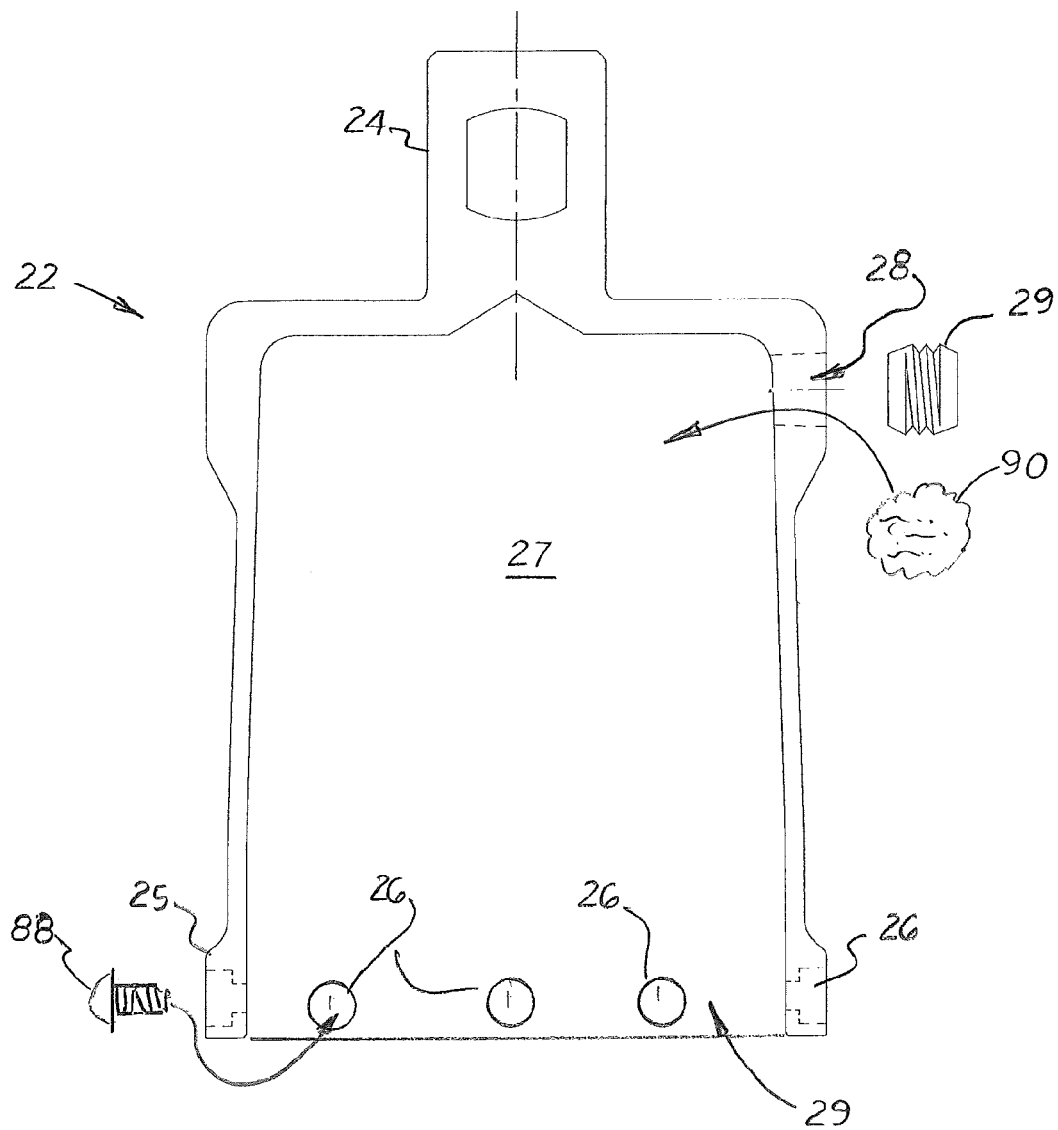
FIG. 2 is a sectional side elevational view of the outer housing.

As shown in FIG. 2, the reservoir body 22 is a cylindrical structure with an upward extending, axially aligned shank 24. Formed on the upper area of the reservoir body 22 is a cutting fluid filling port 28 with a threaded cap 29 attached thereto. When the cap 29 is removed from the filling port 28, the inside cavity 27 of the reservoir body 22 may be filled with suitable cutting fluid 90.

Formed on the bottom edge of the reservoir body 22 is a wide collar 25 as shown in FIGS. 1 and 2. Formed on the wide collar 25 are counter bores 26 that receive threaded connectors 88 that extend inward and connect to threaded bores 41 formed on the upper edge of the pump body 42 to attach the pump assembly 40 to the reservoir body 22 (see FIG. 3).

Figure 3:
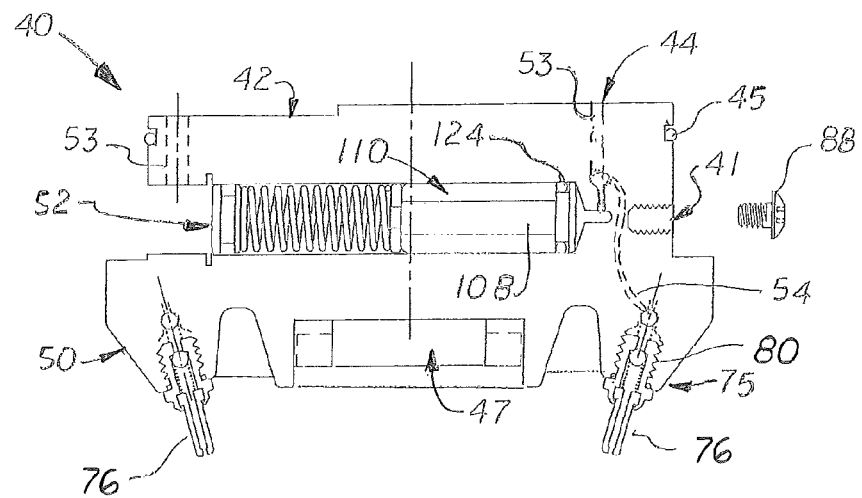
FIG. 3 is a side elevational view partially in section of the pump assembly.
Figure 5:
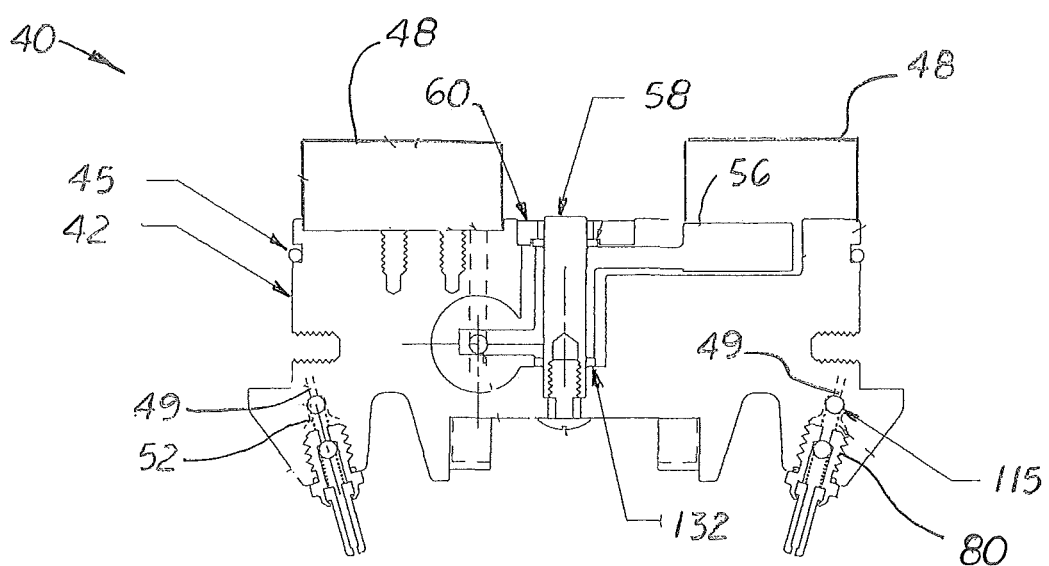
FIG. 5 is a side elevational view of the pump body.
Figure 6:
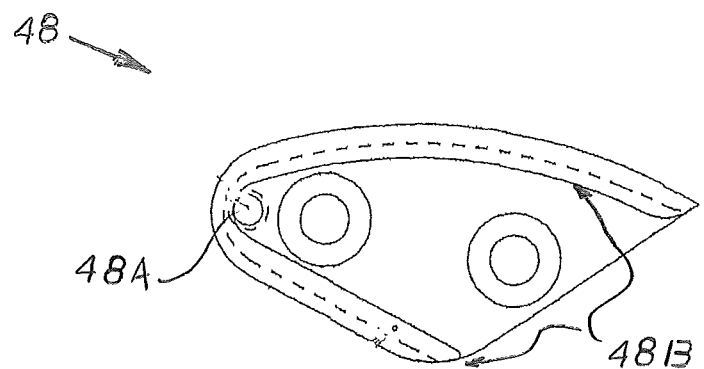
FIG. 6 is a top plan view of a scupper.
Figure 7:
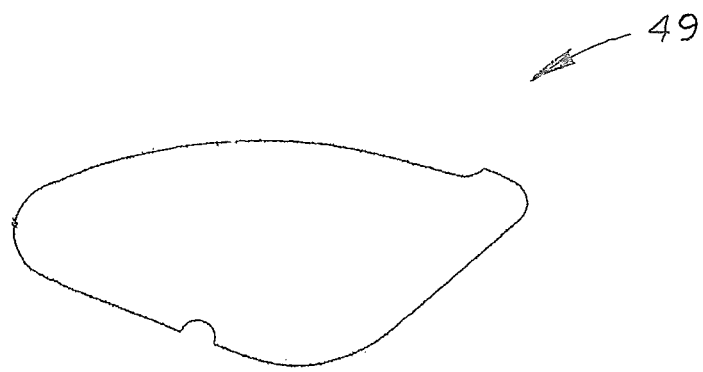
FIG. 7 is a top plan view of the top cap that fits over the scupper.

As shown in FIG. 3, the pump assembly 40 includes a pump body 42 with a cylindrical upper section 44 that fits into the lower opening 29 formed on the reservoir body 22 and a conical-shaped lower section 50. Extending upward from the upper section 44 and on opposite sides of the pump body 42 are two fluid scuppers 48 as shown in FIG. 5. FIG. 6 is a top plan view of a scupper 48 and FIG. 7 is a top plan view of the top cap 49 that fits into slots 48B formed over the scupper 48. The scupper 48 includes a fluid inlet hole 48A and two side slots 48B. The top cap 49 slides into the two slide slots 48B during assembly. The scuppers 48 are used to force cutting fluid 90 towards the center axis of the pump assembly 40 which is needed when the tapping head 100 is operated horizontally.

As shown in FIG. 5, extending through the pump body 42 are fluid passageways 49 that terminate at one end at a discharge nozzle port 80 and at the opposite end under a fluid scupper 48. Formed around the upper section 44 is an o-ring recessed groove 43 in which an o-ring 45 is placed. When the pump body 42 is attached to the reservoir body 22, the o-ring 45 creates a fluid-tight seal.

The fluid passageways 49 are diagonally aligned and converge at approximately 20 degrees from the tool's longitudinal axis 11 shown rotated approximately 22.5 degrees. The fluid passageways 49 terminate one end at a piston discharge nozzle port 74 as shown in FIG. 3. The scuppers 48 are attached to the top surface of the pump body 42 and submerged in the cutting fluid 90 when the pump body 42 is attached to the reservoir body 22.

Figure 12:
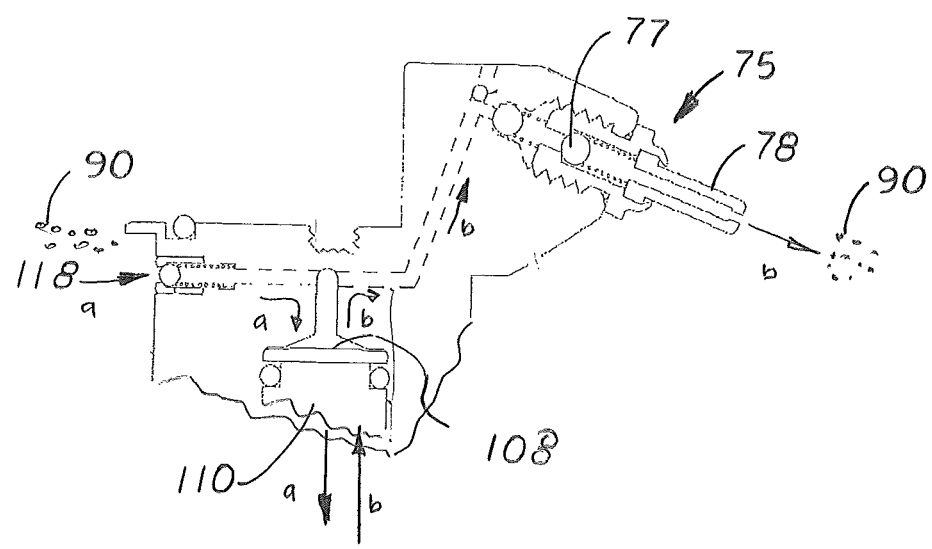
FIG. 12 is a side elevational view of a section of the pump assembly showing the relative locations of the reservoir, the first fluid passage from the reservoir to the piston, and the second fluid passage from the piston to the discharge nozzle.

The pump assembly 40 includes a plurality of biased pistons 108 and piston-springs 52 that fits into transversely aligned piston-spring bores 51 formed on the upper section 44 of the pump body 42. FIG. 12 is a partial sectional view of the pump assembly 40 showing the relative locations of the first fluid passage 53 that extends from the reservoir body 22 and connects to the piston bore 51 and the second fluid passage from the tip of the piston bore 51 to the discharge nozzle 80.

The pump assembly 40 includes a plurality of biased pistons 108 and piston-springs 52 that fits into transversely aligned piston-spring bores 110 formed on the upper section 44 of the pump body 42. FIG. 12 is a partial sectional view of the pump assembly showing the relative locations of the first fluid passage 53 that extends from the reservoir body 22 and connects to the piston cavity 108, and the second fluid passage 54 that extends from the tip of the piston bore 110 to the discharge nozzle 80.

Figure 4:
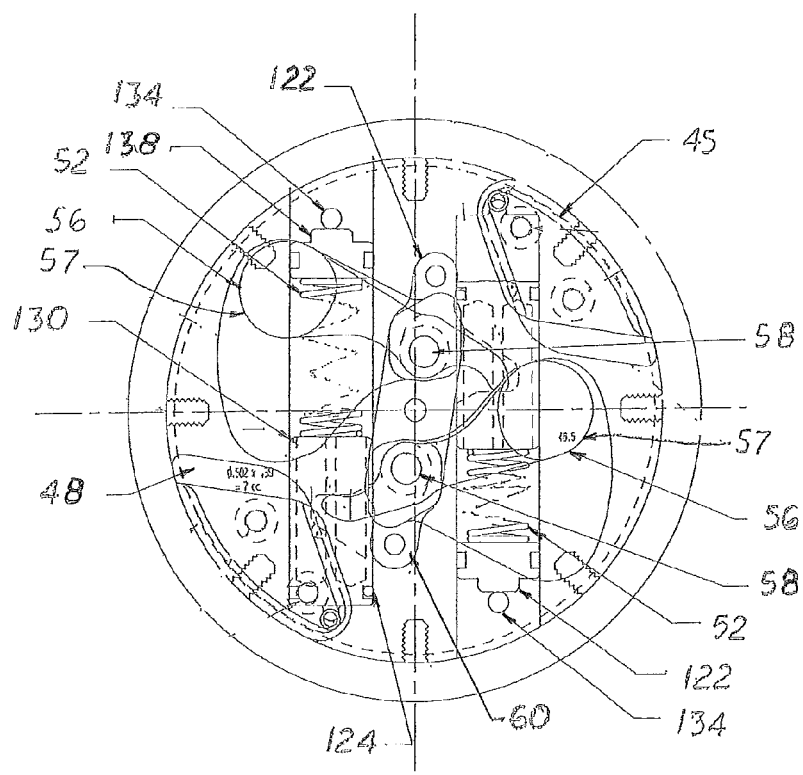
FIG. 4 is a top plan view of the pump body.

Also attached to the top surface of the upper section 44 are two swing arms 56 as shown in FIG. 4. Each swing arm 56 rotates around a pin 58 that is supported and aligned by a pin brace 60. During operation, the two swing arms 56 move between closed and opened positions to regulate the flow of the cutting fluid 90 from the discharge nozzles 80. Each swing arm 56 is biased in a closed position by a compression spring 52. When the tool accessory 20 is rotated, the compression springs 52 are forced outward and store centripetal force. The CNC program then reduces the rotational speed of the tool accessory 20 enabling the two compression springs 52 to overcome the centrifugal forces and force the cutting fluid 90 in the reservoir body 22 through the discharge nozzles 80 attached to the pump's body 42.

Each nozzle assembly 75 includes a threaded discharge nozzle body 76 that receives and attaches to the discharge nozzle port 74. Located inside the discharge nozzle body 76 is a ball valve 77. When the discharge nozzle body 76 is tightened into the nozzle port 74 formed on the pump body 42, the discharge nozzle body 76 presses against the discharge nozzle port 76 as shown in FIGS. 5 and 12. There are different size discharge nozzle bodies 76 with different size outlet openings 79 that discharge different amounts of cutting fluid 90. In the embodiment shown herein, the outlet openings 79 on the nozzle bodies 76 may be 0.012 inch, 0.018 inch and 0.024 inch in diameter. Disposed around the threaded nozzle body 76 and the lower portion is a nut surface that allows the discharge nozzle body 76 to be manually attached and detached from the pump body 42 with a wrench.

The operator may also control the amount of cutting fluid 90 dispensed by using different cutting fluids 90 that have different viscosities, typically with viscosity indexes between 80 and 120. For example, one type of cutting fluid 90 that may be used is sold under the trademark COOL TOOL II sold and distributed by Monroe Fluid Technology. Each pump cycle includes the step of temporarily increasing the rotational speed of the tool 10 and the step of quickly reducing the rotational speed to the desired tapping speed. When tapping holes in a workpiece, the machine may undergo one or more pumping cycles depending on the size and number of holes being tapped.

During operation, the spindle is accelerated to a higher rotation above the desired tapping speed. As the tool accessory 10 is rotated, the weights 57 are forced outward which cause the swing arms 56 to pivot. As each swing arm 56 pivots, the adjacent piston 108 is forced longitudinally in the piston cavity 110. As the piston 108 moves longitudinally, the cutting fluid 90 is drawn thru the one way check valve 118 and into the piston cavity 110. Once the cutting fluid 90 fills the piston cavity 110, the one way check valve 118 closes under spring pressure. When the rotational speed of the spindle is reduced to the desired tapping speed, the compression springs 52 force the piston 108 forward in the piston cavity 110 forcing the cutting fluid 90 out of the piston cavity 110. The one way check valve 118 is closed preventing the cutting fluid 90 from flowing back into the reservoir. The compressed fluid unseats the second check ball valve 77, and is forced through the discharge nozzle 80.

During operation, the rotational speed for tapping holes is approximately 200 RPM's. The maximum rotational speed of the machine is approximately 2,500 RPM. When the machine operates at 2,500 RPM's, the entire piston bore 51 is filled with cutting fluid 90. If the machine operates at 1,800 RPM's, three-fourths of the piston bore 51 may be filled with cutting fluid 90. During setup, the operator may control the amount of cutting fluid 90 that enters the piston cavity 110 by controlling the maximum rotation speed.

If a discharge nozzle body 76 has an outlet opening 79 with a diameter of 0.012 inch, the volume of cutting fluid 90 discharged from the discharge nozzle body 76 is 0.5 to 4 ml depending on the amount of cutting fluid 90 in the piston cavity 110.

In compliance with the statute, the invention described has been described in language more or less specific on structural features. It should be understood however, that the invention is not limited to the features shown, since the means and construction shown, comprises the preferred embodiments for putting the invention into effect. The invention is therefore claimed in any of its forms or modifications within the legitimate and valid scope of the amended claims, appropriately interpreted under the doctrine of equivalents.

I claim:

1. A cutting fluid discharge tool accessory, comprising:
   a. a reservoir body with an axially aligned shank and an inside cavity filled with cutting fluid; and,
   b. a pump assembly aligned below and attached to said reservoir body, said pump assembly includes a pump body attached to said reservoir body and at least one discharge nozzle, said pump body includes a piston cavity and a pump located therein that includes a biased swing arm configured to pivot in one direction and draw cutting fluid into said piston cavity when the rotation speed is greater than a rotation speed needed for tapping, and pivot in the opposite direction forcing said cutting fluid from said piston cavity and into said discharge nozzle when said tool rotates at a rotation speed needed for tapping, said pump assembly includes a cutting tap mounting surface configured to attach to a cutting tap that includes a tip located below said pump assembly, said discharge nozzle assembly includes a discharge nozzle aimed towards said tip cutting tap.

2. The tool accessory, as recited in claim 1 wherein said discharge nozzle is attached to a nozzle bore formed on said pump body.

3. The tool accessory, as recited in claim 1 wherein said swing arm is pivotally attached to said pump assembly and includes a weight and an end that presses against said spring biased piston, when said tool is sufficiently rotated above the tapping speed, said swing arm rotates and allows a compression spring to push said piston move longitudinally inside said piston cavity and draw cutting fluid into said piston cavity, but when said tool is rotated at said tapping speed, said swing arm returns to its original position and said piston is pushed longitudinally inside said piston cavity and forces cutting fluid through said discharge nozzle.

* * * * *